United States Patent
Zhang et al.

(10) Patent No.: US 9,585,024 B2
(45) Date of Patent: Feb. 28, 2017

(54) SYSTEM AND METHOD FOR SELF-ORGANIZED INTER-CELL INTERFERENCE COORDINATION

(75) Inventors: Liqing Zhang, Ottawa (CA); Jianglei Ma, Ottawa (CA); Zhijun Chao, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 676 days.

(21) Appl. No.: 13/106,598

(22) Filed: May 12, 2011

(65) Prior Publication Data

US 2012/0028584 A1 Feb. 2, 2012

Related U.S. Application Data

(60) Provisional application No. 61/367,898, filed on Jul. 27, 2010.

(51) Int. Cl.
| | |
|---|---|
| *H04W 28/02* | (2009.01) |
| *H04W 16/14* | (2009.01) |
| *H04W 24/10* | (2009.01) |
| *H04W 72/04* | (2009.01) |
| *H04W 72/08* | (2009.01) |
| *H04W 92/12* | (2009.01) |

(52) U.S. Cl.
CPC ............ *H04W 16/14* (2013.01); *H04W 24/10* (2013.01); *H04W 72/0433* (2013.01); *H04W 72/082* (2013.01); *H04W 92/12* (2013.01)

(58) Field of Classification Search
CPC ...... H04W 16/04; H04W 16/02; H04W 28/02
USPC ....... 455/425, 62, 63.1, 450, 69, 422.1, 436, 455/522, 455.2; 370/329, 345, 311, 232, 370/328, 331, 252
See application file for complete search history.

(56) References Cited

U.S. PATENT DOCUMENTS

| | | | |
|---|---|---|---|
| 6,128,497 A | 10/2000 | Faruque | |
| 7,412,254 B2 | 8/2008 | Senarath et al. | |
| 2005/0245266 A1* | 11/2005 | Viero et al. | 455/450 |
| 2007/0155431 A1 | 7/2007 | Munzner et al. | |
| 2008/0268833 A1* | 10/2008 | Huang et al. | 455/425 |

(Continued)

FOREIGN PATENT DOCUMENTS

| | | |
|---|---|---|
| CN | 101009622 A | 8/2007 |
| CN | 101360321 A | 2/2009 |

(Continued)

OTHER PUBLICATIONS

Al-Ayyoub, M., et al., Self-regulating Spectrum Management: A Case of Fractional Frequency Reuse Patterns in LTE Networks, IEEE, 2010, 12 pages.
Fodor, G., et al., "Intercell Interference Coordination in OFDMA Networks and in the 3GPP Long Term Evolution System," Journal of Communications, vol. 4, No. 7, Aug. 2009, pp. 445-453.
Racz, A., et al., "On the Impact of Inter-Cell Interference in LTE," IEEE, 2008, 6 pages.

(Continued)

*Primary Examiner* — Cindy Trandai
(74) *Attorney, Agent, or Firm* — Slater Matsil, LLP (57) ABSTRACT

A system and method for self-organized inter-cell interference coordination are provided. A method for controller operations includes receiving signal power measurements at a controller, determining an interference level based on the signal power measurements, generating relationship information based on the interference level, and determining frequency reuse modes for communications controllers controlled by the controller based on the relationship information.

22 Claims, 9 Drawing Sheets (56) References Cited

U.S. PATENT DOCUMENTS

| | | | |
|---|---|---|---|
| 2009/0061778 A1* | 3/2009 | Vrzic et al. | 455/62 |
| 2009/0081955 A1* | 3/2009 | Necker | 455/63.1 |
| 2009/0092059 A1* | 4/2009 | Fu | 370/252 |
| 2010/0222003 A1* | 9/2010 | Yoshii et al. | 455/63.3 |
| 2010/0246538 A1 | 9/2010 | Kravtsov et al. | |
| 2010/0267408 A1 | 10/2010 | Lee et al. | |
| 2010/0303026 A1* | 12/2010 | Chaudhri et al. | 370/329 |
| 2010/0322227 A1* | 12/2010 | Luo | 370/345 |
| 2010/0323712 A1* | 12/2010 | Guey et al. | 455/452.2 |

FOREIGN PATENT DOCUMENTS

| | | |
|---|---|---|
| CN | 101472339 A | 7/2009 |
| CN | 101711033 A | 5/2010 |
| CN | 101742612 A | 6/2010 |
| CN | 101765119 A | 6/2010 |
| CN | 101784116 A | 7/2010 |
| EP | 1940188 A1 | 7/2008 |
| EP | 2194741 A1 | 6/2010 |
| GB | 2433378 A | 6/2007 |
| WO | WO 95/34957 | 12/1995 |
| WO | WO 2009-041040 A1 | 2/2009 |
| WO | WO 2009/052754 A1 | 4/2009 |

OTHER PUBLICATIONS

International Search Report of Patent Cooperation Treaty (PCT), International Application No. PCT/CN2011/075841, date of mailing Oct. 13, 2011, Applicant Huawei Technologies Co., Ltd., et al., 5 pages.

International Search Report of Patent Cooperation Treaty (PCT), International Application No. PCT/CN2011/076008, date of mailing Oct. 13, 2011, Applicant Huawei Technologies Co., Ltd., et al.,5 pages.

European Search Report received in Euopean Patent Application No. 11811798.5, dated Mar. 28, 2013, 6 pages.

Written Opinion of the International Searching Authority received in Patent Cooperation Treaty Application No. PCT/CN2011/075841, dated Oct. 13, 2011, 5 pages.

Written Opinion of the International Searching Authority received in Patent Cooperation Treaty Application No. PCT/CN2011/076008, dated Oct. 13, 2011, 5 pages.

Non-Final Office Action for U.S. Appl. No. 13/118,239, Zhang et al., issued Aug. 23, 2013, 10 pages.

Zhang et al., Non-Final Office Action issued in corresponding U.S. Appl. No. 13/118,239, dated Aug. 23, 2013, 10 pages.

* cited by examiner

SYSTEM AND METHOD FOR SELF-ORGANIZED INTER-CELL INTERFERENCE COORDINATION

This application claims the benefit of U.S. Provisional Application No. 61/367,898, filed on Jul. 27, 2010, entitled "Self-Organized Inter-Cell Interference Coordination (ICIC) Solution," which application is hereby incorporated herein by reference.

TECHNICAL FIELD

The present invention relates generally to digital communications, and more particularly to a system and method for self-organized inter-cell interference coordination (ICIC).

BACKGROUND

Inter-cell interference (ICI) may be considered to be interference at a cell due to transmissions originating in another cell. Usually, ICI occurs between adjacent cells of a communications system. As an example, relatively high-powered transmissions to and from a cell edge user (CEU) operating in a first cell may cause more interference to adjacent cells utilizing the same operating frequency than relatively lower-powered transmissions to and from a cell center user (CCU) operating in the first cell to adjacent cells utilizing the same operating frequency due to correspondingly higher power levels of the transmissions to and from the CEU.

Figure 1:
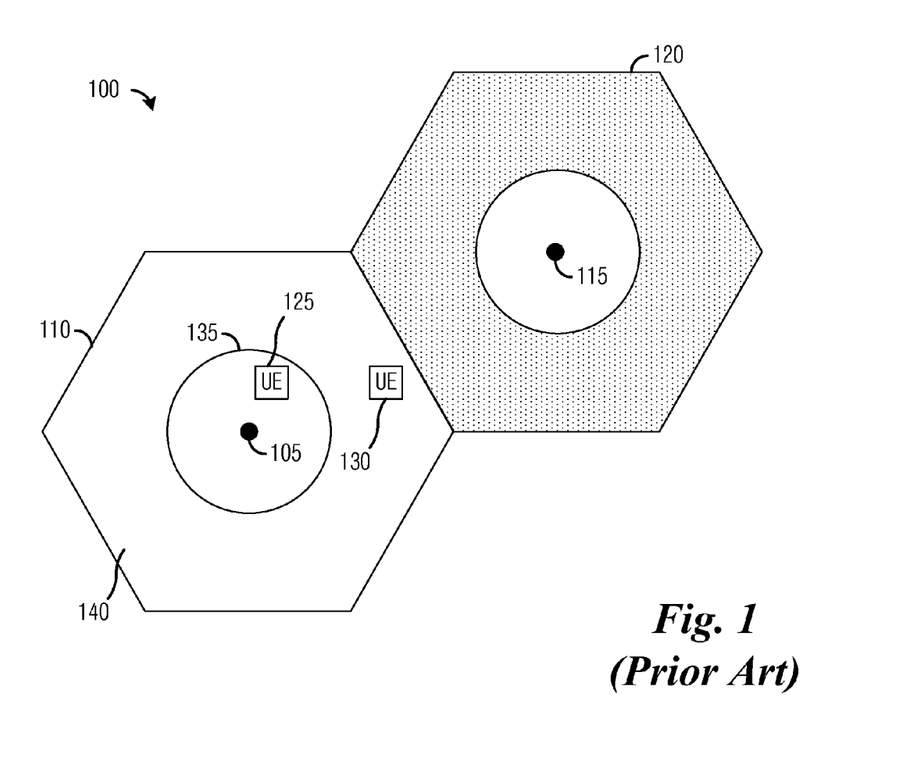
FIG. 1 illustrates an example prior art communications system.

FIG. 1 illustrates a prior art communications system 100. Communications system 100 includes a first enhanced NodeB (eNB) 105 and a second eNB 115. An eNB (also commonly referred to as a base station, communications controller, NodeB, and so forth) may control communications of User Equipment (UE) operating within its coverage area. For example, eNB 105 may have a coverage area illustrated in FIG. 1 as hexagon 110, while eNB 115 may have a coverage area illustrated as hexagon 120. Operating within hexagon 110 may be a first UE 125 and a second UE 130.

A coverage area of an eNB may be categorized based upon a distance to the eNB. For example, coverage area of eNB 105 (i.e., hexagon 110) may be categorized into two regions, with a first region being a cell center region (shown as circle 135) and a cell edge region (portions of hexagon 110 outside of circle 135, shown as region 140). Normally, UEs operating within a cell center region, such as UE 125, may receive transmissions made at a lower power level than UEs operating outside of a cell center region, such as UE 130, due to their closer proximity to an eNB serving the coverage area.

Furthermore, since transmissions made by UEs (i.e., uplink transmissions) operating with a cell edge region, such as UE 130, are usually made at higher power levels and the UEs are also located closer to neighboring (e.g., adjacent) eNBs, the transmissions may cause more interference to the neighboring eNBs. For downlink transmissions, UEs in a first eNB (e.g., a serving eNB) that are located closer to a neighboring eNB (i.e., an adjacent eNB) may experience high interference from transmissions of the neighboring eNB than UEs operating in a cell center region of the first eNB.

It is widely considered that ICI management will be a key technology for enhancing the performance of 3GPP LTE communications system and UE experience. ICIC is a simple and efficient ICI management scheme. Therefore, there is a need for ICI reducing techniques, of which, ICIC is one form. Generally, ICIC attempts to reduce and/or control ICI through the use of radio resource management (RRM) methods. Typically, ICIC takes into account information from multiple cells, such as neighboring cells, to control inter-cell interference. A usual ICIC strategy may be to determine resources available at a cell, which may then be scheduled (i.e., allocated) to users. ICIC in Orthogonal Frequency Division Multiple Access (OFDMA) communications systems, such as Third Generation Partnership Project (3GPP) Long Term Evolution (LTE) compliant communications system, have received considerable study.

SUMMARY OF THE INVENTION

These and other problems are generally solved or circumvented, and technical advantages are generally achieved, by example embodiments of the present invention which provide a system and method for self-organized ICIC.

In accordance with an example embodiment of the present invention, a method for controller operations is provided. The method includes receiving signal power measurements at a controller, determining an interference level based on the signal power measurements, generating relationship information based on the interference level, and determining frequency reuse modes for communications controllers controlled by the controller based on the relationship information.

In accordance with another example embodiment of the present invention, a controller is provided. The controller includes a receiver, an interference estimate unit coupled to the receiver, a relationship information generate unit coupled to the interference estimate unit, and a frequency reuse select unit coupled to the relationship information generate unit. The receiver receives signal power measurements, the interference estimate unit determines an interference level based on the signal power measurements, the relationship information generate unit generates relationship information based on the interference level, and the frequency reuse select unit selects frequency reuse modes for communications controllers controlled by the controller based on the relationship information.

In accordance with another example embodiment of the present invention, a communications system is provided. The communications system includes a plurality of communications controllers. Each communications controller controls communications of at least one communications device coupled to the communications controller, and performs interference coordination for the at least one communications device coupled to the communications controller.

One advantage disclosed herein is that the hierarchical architecture for self-organized ICIC allows for varying degrees of self-organized ICIC, with the degree of self-organized ICIC employed being dependent upon ICIC performance targets, communications system performance targets, available communications and computational resources, and so forth.

A further advantage of exemplary embodiments is that automated ICIC planning is supported in the hierarchical architecture. Therefore, difficult manual ICIC planning, which may also tend to be error-prone, especially for communications systems with irregular layouts, may be eliminated. Automatic ICIC without manual interaction will further improve operating efficiency and reduce operating costs.

Yet another advantage of exemplary embodiments is that ICIC mode optimization is provided to provide dynamic ICIC mode adjustments to meet communications system conditions. Dynamic ICIC mode adjustments may be made as frequent as desired to meet ICIC performance targets, communications system performance targets, available communications and computational resources, and so forth.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a 3GPP LTE compliant communications system. The invention may also be applied, however, to other Orthogonal Frequency Division Multiple Access (OFDMA) communications systems, such as 3GPP LTE-Advanced, WiMAX, IEEE 802.16, and so forth, compliant communications systems.

Existing ICIC techniques include:

Manual Geo-based reuse-three planning and ICIC configuration: This scheme makes use of cell/eNB locations to manually plan a frequency patterns to avoid limited non-overlapping of three frequency bands. It is very costly to operators and the performance is poor, especially for irregular layouts, due to being location and antenna-direction based.

Fixed FFR reuse-three: This is a commonly used FFR reuse pattern for ICIC control. It has difficulty with frequency planning problems and the three modes are not sufficient to assign non-overlapping patterns when interference scenarios (e.g., large metropolitan areas) and cell neighbor relationship are complicated.

Fixed seven reuse mode: It can resolve more colors to complicated interference scenarios but can waste frequency reuse resources to certain regular field layouts when three colors are enough. This reuse mode defines one mode with less interference band for cell edge uses in all other cells, it will cause interference, e.g., when two UEs from two neighbor cells handover to another their common neighbor cell.

Fractional Frequency Reuse (FFR) is an important ICIC technique for OFDMA system. FFR reduces the interference caused by neighboring cells using the same frequency band and can thus help to increase user throughput and overall network capacity. FFR may be difficult to implement in field areas with complicated interference scenarios, such as, large metropolitan areas. For example, FFR with reuse-three cannot handle frequency planning problems and the three modes may not be sufficient to assign non-overlapping patterns. Therefore, resulting in communications system performance degradation, such as an overall coverage of the communications system and handovers (HO).

Figure 2:
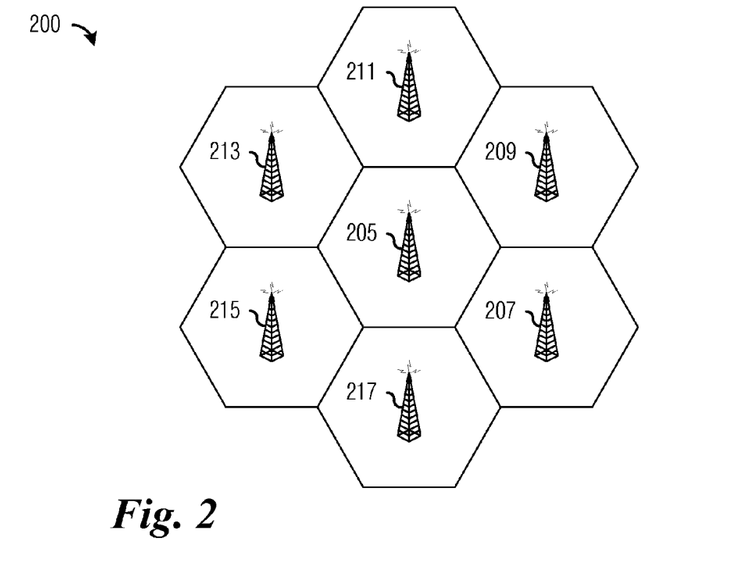
FIG. 2 illustrates an example communications system according to example embodiments described herein.

FIG. 2 illustrates a communications system 200. Communications system 200 includes a number of eNBs, such as eNBs 205 through 217. A first-order neighboring eNB may be defined as eNBs that are directly adjacent to one another. As shown in FIG. 2, eNBs 207 through 217 are first-order neighboring eNBs of eNB 205. A second-order neighboring eNB may be defined as eNBs that are not directly adjacent to one another but are neighboring eNBs to one intermediate eNB. As shown in FIG. 2, eNBs 209 and 215 are second-order neighboring eNBs (through intermediate eNB 205). Similar definitions may be had for higher-order neighboring eNBs.

A system and method for self-organized ICIC may be expected to provide for the following:

Self-organized network with automatic ICIC frequency reuse pattern configuration;

Self-optimized network with automatic ICIC performance optimization which may yield improved communications system capacity and coverage, and automatic HO performance enhancement which may result in better HO success rate; and Self operation and management (O&M) network with ICIC behavior monitoring which may provide automatic ICIC failure detection and correction.

Figure 3:
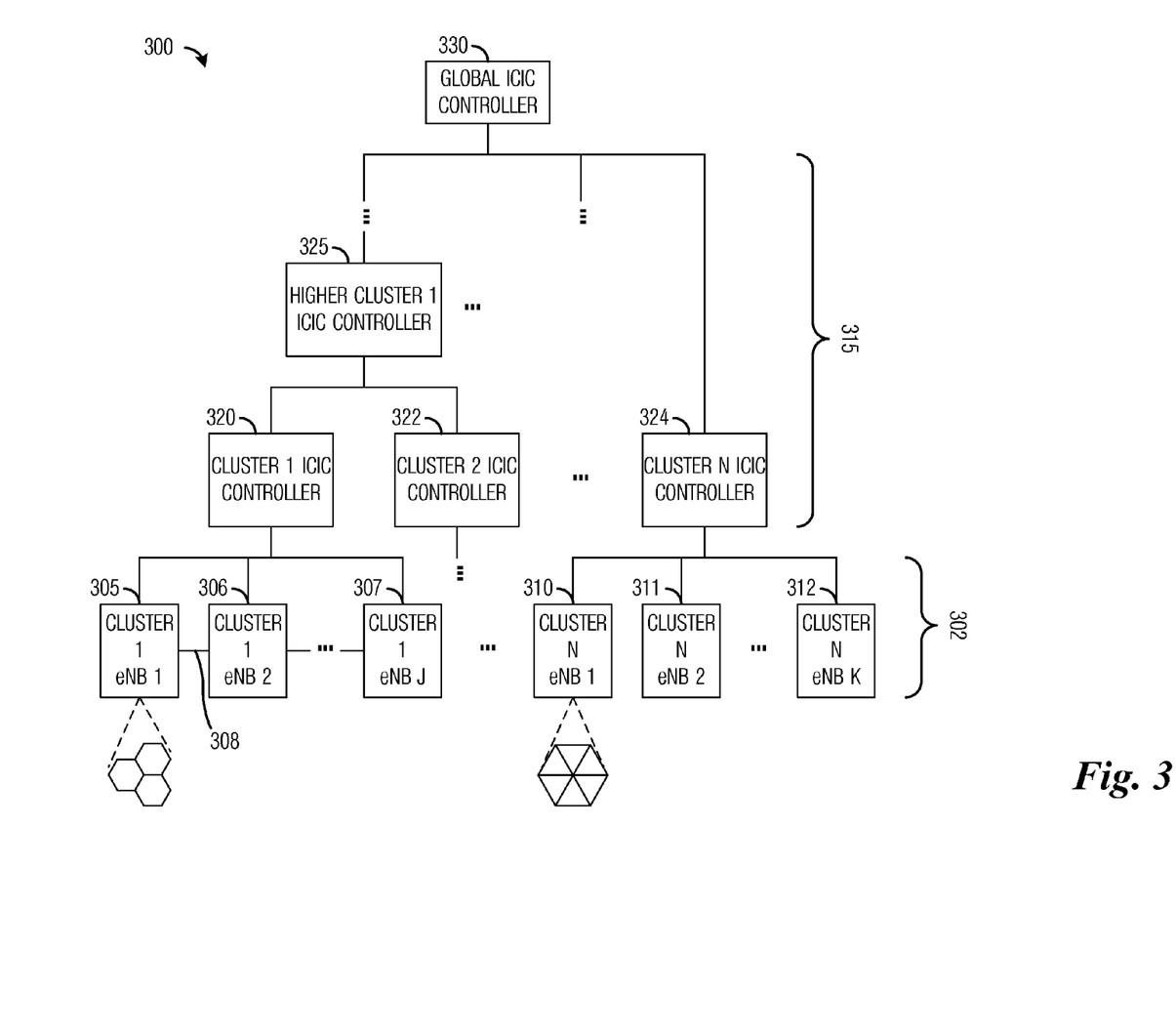
FIG. 3 illustrates an example detailed view of a communications system according to example embodiments described herein.

FIG. 3 illustrates a detailed view of a communications system 300. The architecture of communications system 300 may be hierarchical in design, which may provide a range of ICIC functionality depending upon presence or absence of hardware, a number of performance criteria, such as desired ICIC performance, available computational and/or communications resources, desired communications system performance, and so on.

At a lowest level of communications system 300, referred to as an intra-eNB level 302, there may be eNBs that each perform self-organized ICIC and optimization for cells making up the eNB. As shown in FIG. 3, there may be multiple eNBs, such as cluster 1 eNBs (including cluster 1 eNBs 305 through 307), and cluster N eNBs (including cluster N eNBs 310 through 312).

A subset of eNBs in intra-eNB level 302 may perform inter-eNB self-organized ICIC and optimization. Some eNBs may not perform inter-eNB self-organized ICIC and optimization because there is not a need for inter-eNB ICIC or the eNBs are not capable of performing inter-eNB self-organized ICIC and optimization. The eNBs may perform ICIC self-organization and optimization independent of other eNBs. As an example, an eNB may select frequency reuse modes for its cells. The frequency reuse mode selection may be made based on measurements made by UEs served by the eNB and may be reported to the eNB. From the reported measurements, the eNB may be able to determine interference from neighboring eNBs, which may be used to make the frequency reuse mode selections when inter-eNB ICIC self-organization and optimization is enabled. Information about the interference from neighboring eNBs may be used to develop neighboring relationship information.

If an inter-eNB interface 308, such as an X2 interface, is available, the eNBs so coupled may be able to share interference information (as well as other neighboring relationship information). For example, the eNBs may share interference self-coordination information, including interference information, neighboring relationship information, and so on. The eNBs may then perform distributed ICIC self-organization and optimization making use of the shared interference information (and/or other neighboring relationship information) to make the frequency reuse mode selections. The use of the shared interference information and/or other neighboring relationship information may help the eNBs to make better frequency reuse mode selections.

Above intra-eNB level 302 may be a cluster level 315, may include groupings of eNBs that may be controlled by cluster ICIC controllers. For example, as shown in FIG. 3, cluster 1 ICIC controller 320 may perform ICIC self-organization and optimization for cluster 1 eNBs 305 through 307, and cluster N ICIC controller 324 may perform ICIC self-organization and optimization for cluster N eNBs 310 through 312. Although its eNBs are not shown in FIG. 3, cluster 2 ICIC controller 322 may perform ICIC self-organization and optimization for one or more eNBs. In general, when a cluster ICIC controller is present, the cluster ICIC controller may perform ICIC self-organization and optimization for eNBs coupled to the cluster ICIC controller.

In general, when a cluster ICIC controller is available, eNBs coupled to the cluster ICIC controller may provide interference information and/or other neighboring relationship information to the cluster ICIC controller, which may perform ICIC self-organization and/or optimization. For example, the cluster ICIC controller may make frequency reuse mode selections for the eNBs based on the provided interference information and/or other neighboring relationship information, and then after the initial frequency reuse mode selection, the cluster ICIC controller may also perform optimization of the frequency reuse modes to help further improve performance.

According to an example embodiment, the cluster ICIC controller may be used to perform only ICIC optimization. For example, the eNBs coupled to the cluster ICIC controller may perform self-organized ICIC (as described above for a communications system without cluster ICIC controllers). The eNBs may then provide interference information and/or other neighboring relationship information to the cluster ICIC controller and the cluster ICIC controller may make use of the provided interference information and/or other neighboring relationship information to provide a centralized view in ICIC optimization.

According to an example embodiment, if an inter-eNB interface, such as an X2 interface, is available to connect the eNBs also coupled to a cluster ICIC controller, the inter-eNB interface may be used to allow the eNBs to share the interference information and/or other neighboring relationship information to improve the self-organized ICIC performed by the eNBs. For example, the eNBs may share interference self-coordination information, including interference information, neighboring relationship information, and so on. However, the cluster ICIC controller may still be used to provide a centralized view in ICIC optimization. For example, a cluster ICIC controller may be used to resolve conflicts in eNBs coupled to the cluster ICIC controller after an X2 interface based distributed self-organized ICIC has been performed.

An advantage of cluster ICIC controllers may be increased flexibility and simplicity in ICIC. For example, a particular portion of communications system 300 may suffer from additional interference or has a complex structure. A cluster ICIC controller coupled to eNBs operating within the particular portion of communications system 300 may allow for the use of an advanced ICIC algorithm to help perform ICIC or assist in performing ICIC within the particular portion of communications system 300 only. While other portions of communications system 300 may not need the use of an advanced ICIC algorithm or any ICIC at all.

There may be multiple levels of cluster ICIC controllers. As an example, higher cluster 1 ICIC controller 325 may couple cluster 1 ICIC controller 320 and cluster 2 ICIC controller 322 and perform ICIC self-organization and optimization for cluster 1 ICIC controller 320, cluster 2 ICIC controller 322, cluster 1 eNBs 305 through 307, as well as any eNBs coupled to cluster 2 ICIC controller 322. Higher cluster ICIC controllers may perform ICIC self-organization and optimization for ICIC controllers and eNBs coupled to them. However, cluster N ICIC controller 324 is not coupled to a higher cluster ICIC controller.

The higher cluster ICIC controllers may perform ICIC for the cluster ICIC controllers and/or eNBs coupled to them. The higher cluster ICIC controllers may perform ICIC for a larger region, such as a metropolitan area. The multiple levels of regional cluster controllers may be considered to be providers of ICIC for larger and larger regions. Cluster controllers may also provide slow (e.g., at an hourly, daily, and so forth, level) ICIC frequency reuse optimization without placing undue computational and/or communications load on eNBs.

According to an example embodiment, a number of levels in cluster level 315, which may range from zero to one, two, three, four, or more, may be dependent on ICIC criteria, such as a level of ICIC infrastructure investment, desired level of ICIC performance beyond a neighborhood scope, availability of communications infrastructure (for interaction between ICIC participants, for example), desired overall communications system performance level, and so forth.

Above cluster level 315 (or intra-eNB level 302 if cluster level 315 is not present), a global ICIC controller 330 may be used to provide ICIC for devices coupled to it. Global ICIC controller 330 may also be referred to as an Operations Support System (OSS) module. Global ICIC controller 330 may provide low level ICIC operation, such as frequency reuse organization, ICIC optimization, and O&M. Furthermore, global ICIC controller 330 may provide coordination, planning, and information sharing between devices coupled to it, especially for those devices that are not first- or second-order neighbors of one another and communications may be difficult, expensive, slow, or so on. Global ICIC controller 330 may also provide for inter-cluster eNB, inter-cluster controller, or global coordination even when inter-eNB interface(s), such as an X2 interface, is not available.

The hierarchical structure of the architecture of communications system 300 may allow for a flexible level of ICIC performance. As an example, cluster 1 ICIC controller 320 and cluster 2 ICIC controller 322 may be coupled to higher cluster 1 ICIC controller 325, while cluster N ICIC controller 324 may not be. For discussion purposes, consider that cluster 1 ICIC controller 320 and cluster 2 ICIC controller 322 are used to perform ICIC operations for two busy areas that are closely located so there may be interaction between the two (and hence the presence of higher cluster 1 ICIC controller 325, while cluster N ICIC controller 324 may be used to perform ICIC operations for a distant area).

The hierarchical structure of the architecture of communications system 300 may also allow for flexibility in the addition of additional devices, such as eNBs, cluster ICIC controllers, higher cluster ICIC controllers, and so forth, as the needs of communications system 300 changes through time as subscribers change, move around, and so forth. For discussion purposes, consider a situation wherein the area controlled by cluster N ICIC controller 324 grows larger and larger to a point where a new cluster ICIC controller needs to be added. Then, a higher cluster ICIC controller may be added to perform ICIC operations for cluster N ICIC controller 324 and the newly added cluster ICIC controller.

In general, ICIC operations may occur with or without an inter-eNB interface, such as an X2 interface. For example, with the inter-eNB interface, the eNBs may share interference self-coordination information, including interference information, neighboring relationship information, and so on. Without the inter-eNB interface, intra-eNB dynamic ICIC may be performed with frequency reuse mode selection negotiation and coordination. Additionally, slow ICIC frequency reuse optimization through an ICIC controller in a centralized approach may be used. Frequency reuse mode optimization and frequency reuse bandwidth optimization may be performed. Furthermore, coordinated resource block blocking for partially loaded or unbalanced loaded communications systems may be performed without high speed signaling.

Figure 4A:
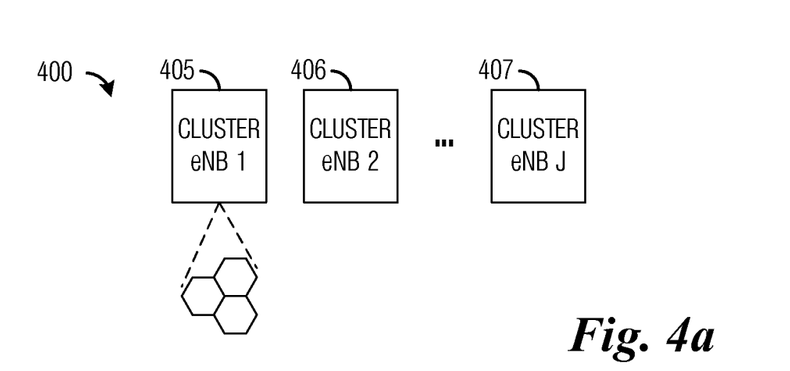
FIGS. 4a through 4f illustrate example communications systems according to example embodiments described herein.

FIG. 4a illustrates a communications system 400. Communications system 400 includes a plurality of eNBs, such as eNBs 405 through 407. As shown in FIG. 4a, the plurality of eNBs does not have an inter-eNB interface (such as an X2 interface) so exchanging information between the eNBs of the plurality of eNBs may be relatively slow. Each of the eNBs may each perform ICIC frequency reuse mode selection as well as fast ICIC frequency reuse optimization among its own sectors. Coordination and/or sharing of information between the eNBs may be limited to the ICIC frequency reuse modes once they have been selected and/or optimized.

Figure 4B:
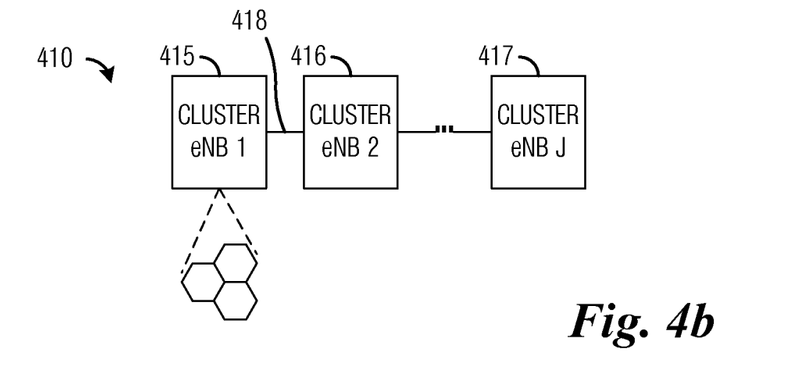

FIG. 4b illustrates a communications system 410. Communications system 410 includes a plurality of eNBs, such as eNBs 415 through 417. As shown in FIG. 4b, the plurality of eNBs does have an inter-eNB interface (such as an X2 interface) through an high speed interconnection 418 so exchanging information between the eNBs of the plurality of eNBs may be relatively fast. The eNBs may each perform ICIC frequency reuse mode selection as well as fast ICIC frequency reuse optimization among its own sectors. However, since inter-eNB communications may occur relatively quickly, the eNBs may exchange ICIC information and coordinate with one another while performing frequency reuse mode selection as well as ICIC frequency reuse optimization. With the presence of the inter-eNB interface, the eNBs may perform a distributed ICIC self-organization and optimization.

Figure 4C:
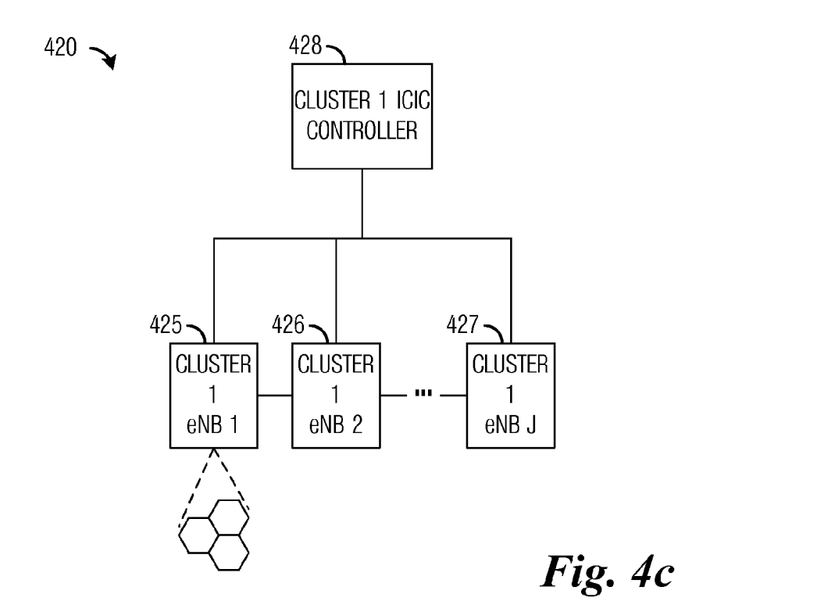

FIG. 4c illustrates a communications system 420. Communications system 420 includes a plurality of eNBs, such as eNBs 425 through 427, as well as a cluster ICIC controller 428. As shown in FIG. 4c, the plurality of eNBs does have an inter-eNB interface through a high speed interconnection so exchanging information between the eNBs of the plurality of eNBs may be relatively fast. With the presence of cluster ICIC controller 428, the eNBs may use cluster controller 428 to perform frequency reuse planning and slow frequency reuse optimization through inter-eNB coordination even if the inter-eNB interface is not present. Furthermore, the presence of cluster ICIC controller 428 may allow for ICIC performance that is better than if high speed signaling is available alone. Both self-organized frequency reuse mode selection and slow (e.g., hourly, daily, and so forth) as well as fast ICIC frequency reuse optimization may be performed. Even with the presence of the X2 interface, a cluster ICIC controller can perform self-organized ICIC and optimization. However, eNB may further perform local ICIC optimization with X2 interface-based distributed ICIC algorithm.

Figure 4D:
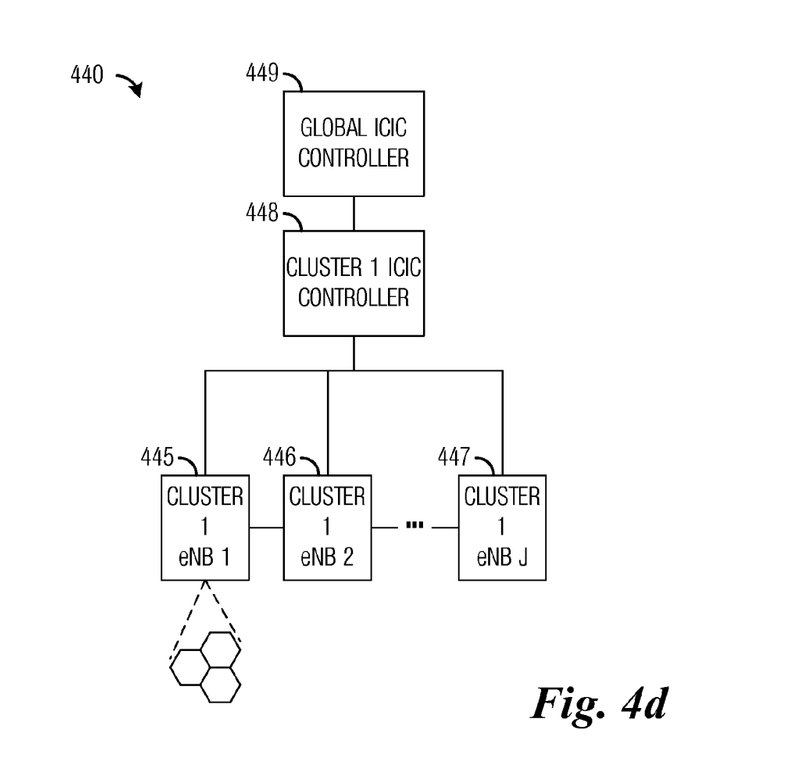

FIG. 4d illustrates a communications system 440. Communications system 440 includes a plurality of eNBs, such as eNBs 445 through 447, as well as a cluster ICIC controller 448 and a global ICIC controller 449. As shown in FIG. 4d, the plurality of eNBs does have an inter-eNB interface through a high speed interconnection so exchanging information between the eNBs of the plurality of eNBs may be relatively fast. With the presence of global ICIC controller 449, global frequency reuse mode planning and/or optimization may be possible. Even without the inter-eNB interface, both self-organized frequency reuse mode selection and slow ICIC frequency reuse optimization may be possible under the control of global ICIC controller 449. When global ICIC controller 449 is present, cluster ICIC controller 448 (as well as other cluster ICIC controllers and higher cluster ICIC controllers in a cluster level may be optional or simplified as information relay nodes. With the inter-eNB interface, fast ICIC frequency reuse optimization may be possible under the control of global ICIC controller 449.

Figure 4E:
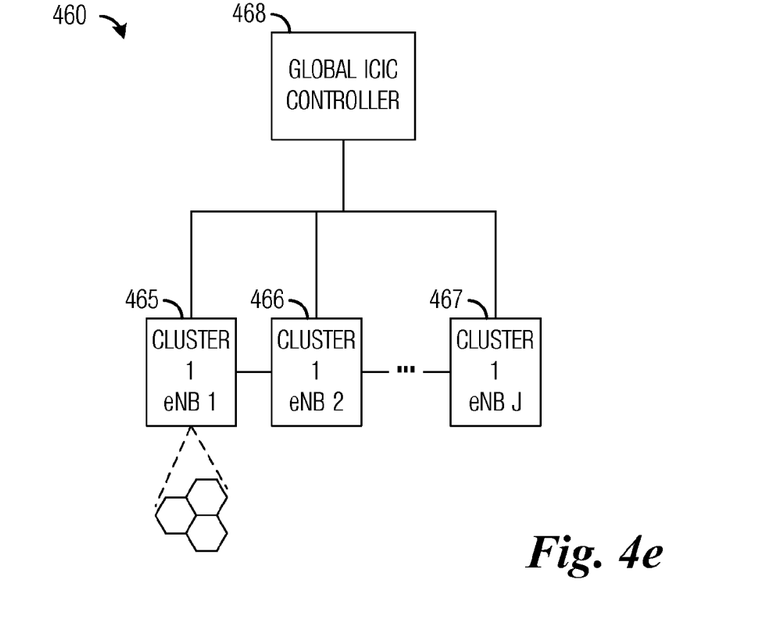

FIG. 4e illustrates a communications system 460. Communications system 460 includes a plurality of eNBs, such as eNBs 465 through 467, as well as a global ICIC controller 468. As shown in FIG. 4e, the plurality of eNBs does have an inter-eNB interface through a high speed interconnection so exchanging information between the eNBs of the plurality of eNBs may be relatively fast. With the presence of global ICIC controller 468, global frequency reuse mode planning and/or optimization may be possible. Even without the help of inter-eNB interface, both self-organized frequency reuse mode selection and slow ICIC frequency reuse optimization may be possible under the control of global ICIC controller 468. Since global ICIC controller 468 is present, cluster ICIC controller(s) may not be necessary. With the inter-eNB interface, fast ICIC frequency reuse optimization may be possible under the control of global ICIC controller 468. The eNB may also perform a localized ICIC organization optimization to adapt to the local change of the operating environment and condition, such as the network topology, UE distribution, cell loading and so on.

Figure 4F:
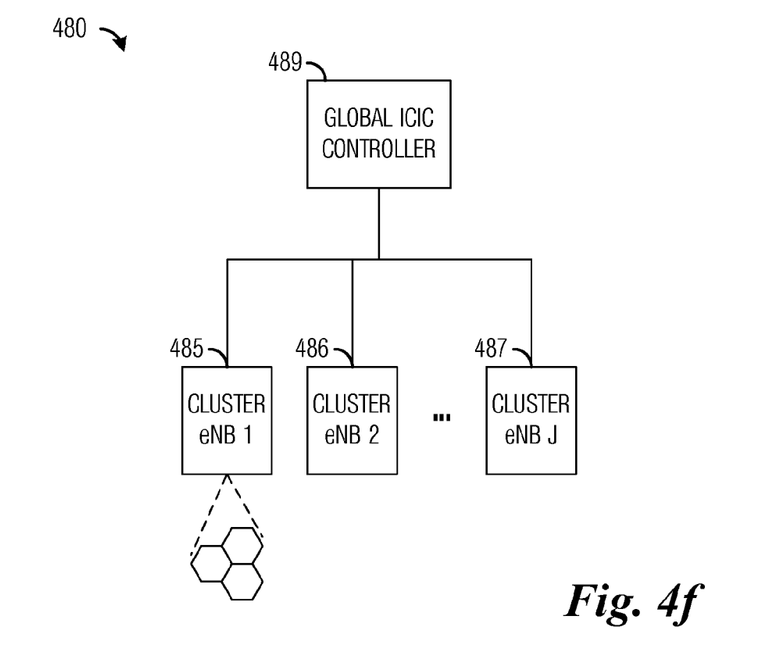

FIG. 4f illustrates a communications system 480. Communications system 480 includes a plurality of eNBs, such as eNBs 485 through 487, as well as a global ICIC controller 489. As shown in FIG. 4f, the plurality of eNBs does not have an inter-eNB interface so exchanging information between the eNBs of the plurality of eNBs may be relatively slow. The eNBs may each perform ICIC frequency reuse mode selection as well as fast ICIC frequency reuse optimization among its own sectors. With the presence of global ICIC controller 489, global frequency reuse mode planning and/or optimization may be possible. Even without the inter-eNB interface, both self-organized frequency reuse mode selection and slow ICIC frequency reuse optimization may be possible under the control of global ICIC controller 489. Since global ICIC controller 489 is present, cluster ICIC controller(s) may not be necessary. Without the inter-eNB interface, fast ICIC frequency reuse optimization may be possible under the control of global ICIC controller 489.

Mutual relationship information may be a key component in ICIC self-organization and optimization. Mutual relationship information may provide information related to interference at an eNB from its neighboring eNBs (typically first-order eNBs, but information for higher-order eNBs may also be included). Mutual relationship information for the eNB may be generated from information provided by UEs served by the eNB. The NRT may be used by the eNBs, cluster ICIC controllers, higher cluster ICIC controllers, global ICIC, and so forth, to perform ICIC self-organization and optimization, such as frequency reuse mode planning, frequency reuse optimization, and so on.

Generally, an eNB may have a single set of mutual relationship information for both uplink and downlink channels. However, separate sets of mutual relationship information for the uplink and the downlink channels may be possible.

Figure 5:
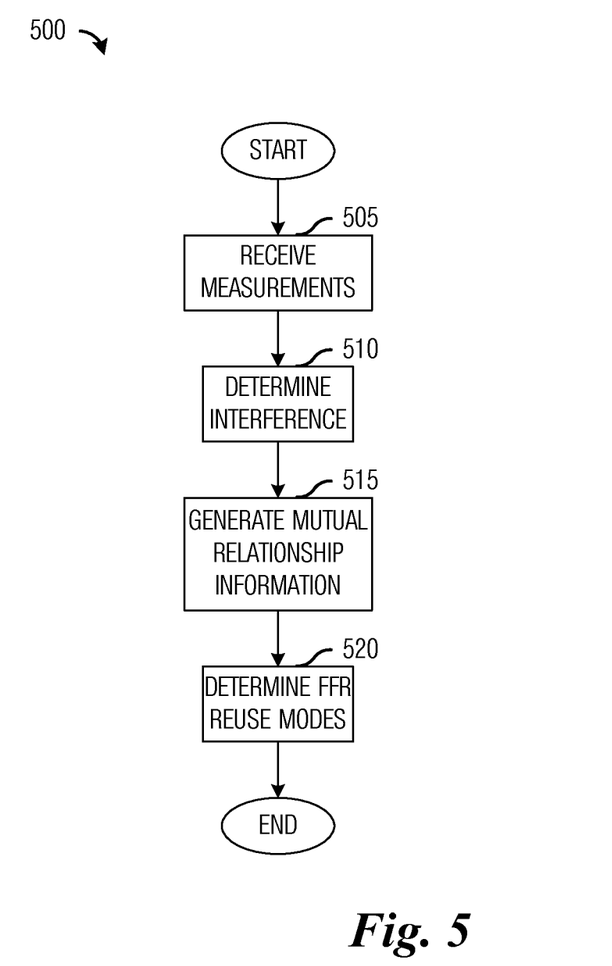
FIG. 5 illustrates an example flow diagram of operations in determining frequency reuse modes based on a NRT according to example embodiments described herein.

FIG. 5 illustrates a flow diagram of operations 500 in determining frequency reuse modes based on mutual relationship information. Operations 500 may be indicative of operations occurring in an eNB of a communications system as the eNB determines frequency reuse modes using a mutual relationship information as well as information based on the mutual relationship information. Operations 500 may occur while the eNB is in a normal operating mode and is initially performing ICIC, i.e., ICIC self-organization.

Operations 500 may begin with the eNB receiving signal power measurement reports from UEs served by the eNB (block 505). According to an example embodiment, the UEs served by the eNB may measure a reference signal (e.g., a pilot signal) transmitted by the eNB and report signal power measurements back to the eNB. The UEs may measure the reference signal over an extended period of time to potentially provide a better indication of interference experienced by the UEs. As an example, the UEs may measure the reference signal over a plurality of frames. UEs may also report to their serving eNB the interference levels of neighboring eNBs by measuring the pilot signals of the neighboring eNBs, for example. The UEs may notify report the measurements to their serving eNB in the form of a Reference Signal Received Power (RSRP) report.

The eNB may determine an interference level experienced by the UEs based on the signal power measurement reports received from the UEs (block 510). According to an example embodiment, the eNB may weigh the signal power measurement reports provided by the UEs. For example, the eNB may apply weights based on factors such as UE distribution, UE distance, UE priority, UE capability (in terms of measurements, for example), inter-cell interference distribution, and so on.

In addition to the signal power measurement reports from the UEs, the eNB may also make use of additional information from other sources. As an example, the eNB may also make use of downlink UE categorization based on the signal power measurement reports as well as cell edge user and/or cell center user distribution information. Furthermore, the eNB may also make use of channel quality reports, such as channel quality indicators (CQI), from the UEs, as well as other forms of channel quality information.

From the interference level experienced by the UEs, the eNB may generate neighbor information (also block 510). The neighbor information may be information pertaining to neighbors of the eNB, and may include interference information (as well as other types of information, including geographical information) about first-order neighbors, second-order neighbors, and so on, which cause non-zero interference to the eNB. According to an example embodiment, the neighbor information may be generated from the signal power measurement reports provided by the UEs.

The eNB may generate the mutual relationship information from the neighbor information (block 515). As an example, the eNB may be able to derive from the neighbor information the strongest sources of interference, which may tend to be first-order neighbors. Weaker sources of interference may be second-order (or higher) neighbors, low-power neighbors, or so on. For macro eNBs, the eNB may also know at least a general location of the macro eNB. For low-power eNBs, the eNB may be able to determine an estimate of the location of the low-power eNB from the signal power measurement reports, the interference levels, and so forth. Generally, the mutual relationship information is a subset of the neighbor information of the eNB.

The eNB may also make use of neighbor information from neighboring eNBs. Information from neighbor information of neighboring eNBs may be used by the eNB to generate its own mutual relationship information or enhance its own mutual relationship information. As an example, the eNB may make use of information from the neighbor information of the neighboring eNBs if the neighbor information from the neighboring eNBs contains information about neighboring eNBs that are in the eNB's neighbor information.

The neighbor information may be exchanged with neighboring eNBs through neighbor information relationship messages. If the eNBs have an inter-eNB interface, such as an X2 interface, then the neighbor information relationship messages may be transmitted more quickly and perhaps with more frequency. If there isn't an inter-eNB interface, then the neighbor information relationship messages may be exchanged with less frequency or not at all.

The eNB may determine the frequency reuse modes from the mutual relationship information (block 520). According to an example embodiment, the eNB may determine the frequency reuse modes based on interference from neighboring eNBs in the mutual relationship information. For example, the eNB may select frequency reuse modes that do not include frequencies spanning interference from the neighboring eNBs and/or select different transmission times to avoid interference from the neighboring eNBs. Different ICIC algorithms may be supported in a single communications system, such as dynamic ICIC with and without an inter-eNB interface.

The selected frequency reuse modes selected by the eNB may be shared with neighboring eNBs to help further refine the frequency reuse modes.

Operations 500 may also be used to optimize frequency reuse modes once the communications system is in operation and operating conditions change, thereby causing frequency reuse modes selected during ICIC self-organizing to no longer mitigate interference as well as they originally did. For example, operations 500 may be repeated as UE distributions change, communications system traffic load and/or distribution change, number of UE change, a fault in an entity in the communications system is detected or corrected, or so forth.

According to an alternative embodiment, ICIC self-organization and optimization may occur an ICIC controller other than an eNB, namely, a cluster ICIC controller, a higher cluster ICIC controller, or a global ICIC controller. When ICIC self-organization and optimization occur at an ICIC controller other than an eNB, eNBs may still perform parts of operations 500 with possible exception of determining frequency reuse modes (block 520).

Instead of (or in addition to) determining frequency reuse modes (block 520), the eNBs may send mutual relationship information to the ICIC controller (e.g., a cluster ICIC controller, a higher cluster ICIC controller, or a global ICIC controller) and the ICIC controller may perform ICIC self-organization and optimization, e.g., determine frequency reuse modes. Since the ICIC controller has mutual relationship information for the eNBs coupled to it, the ICIC controller may be able to perform ICIC self-organization and optimization that is optimal or regionally optimal.

According to an example embodiment, if there are no ICIC controllers other than eNBs (i.e., if there are no cluster ICIC controllers, higher cluster ICIC controllers, or global ICIC controllers), but if there is an inter-eNB interface between eNBs, then the neighbor relationship information may be shared between the eNBs. The sharing of the mutual relationship information may allow for the eNBs to potentially perform better ICIC self-organization and optimization.

ICIC operation typically does not stop once the frequency reuse modes have been selected (as described above). Due to changing conditions, such as communications system load, communications system traffic, UE mobility, faults, and so forth, it may be possible that frequency reuse modes selected in ICIC self-organization may no longer provide optimal performance. Therefore, there is a need to perform ICIC frequency reuse mode optimization while the communications system is already in operation.

According to an example embodiment, ICIC frequency reuse mode optimization may occur at a time event (e.g., periodic intervals, prespecified times, etc.), upon an occurrence of a trigger event, or combinations thereof. Examples of trigger events may include estimated interference at one or more eNBs exceeding an interference threshold, error rates of transmissions at one or more eNBs exceeding an error threshold, handovers failure rates at one or more eNBs exceeding an handover threshold, receipt of an instruction to perform ICIC frequency reuse mode optimization, or so on.

According to an example embodiment, ICIC frequency reuse mode optimization may occur in a centralized manner, such as in a cluster ICIC controller, a higher cluster ICIC controller, a global ICIC controller, or combinations thereof, or in a distributed manner, such as in eNBs, cluster ICIC controllers, higher cluster ICIC controllers, or combinations thereof. According to another example embodiment, ICIC frequency reuse mode optimization may occur in a combination of centralized manner and distributed manner.

Figure 6A:
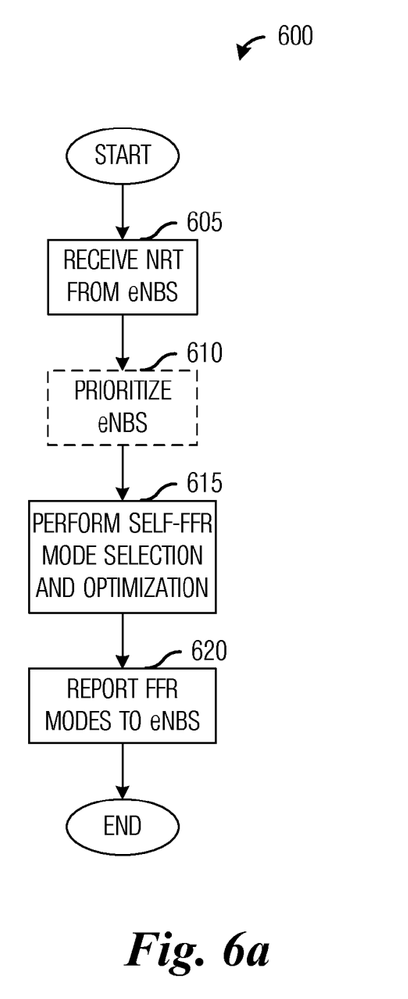
FIG. 6a illustrates an example flow diagram of operations in ICIC frequency reuse mode optimization in a centralized manner according to example embodiments described herein.

FIG. 6a illustrates a flow diagram of operations 600 in ICIC frequency reuse mode optimization in a centralized manner. Operations 600 may be indicative of operations occurring in an ICIC controller, such as a cluster controller, a higher cluster controller, or a global ICIC controller, as the ICIC controller performs ICIC frequency reuse mode optimization to meet changing operating conditions. Operations 600 may occur while the ICIC controller is in a normal operating mode.

Operations 600 may begin with the ICIC controller receiving mutual relationship information from eNBs (block 605). The ICIC controller may optionally prioritize the eNBs (block 610). According to an example embodiment, the ICIC controller may prioritize the eNBs based on the amount of interference that the eNBs receive, and select ICIC frequency reuse modes for the eNBs with the most interference, for example. Furthermore, the eNBs with the most interference may also be given priority when there are conflicts in selected ICIC frequency reuse modes. In addition to eNB interference, other factors that may be used in conflict resolution include UE priority, UE distribution, geographical information, eNB priority, and so on.

The ICIC controller may perform self-frequency reuse mode selection and optimization for the eNBs (block 615). According to an example embodiment, the ICIC controller may perform the self-frequency reuse mode selection and optimization based on a prioritized list of eNBs, such as generated in block 610. The ICIC controller may report the ICIC frequency reuse modes selected for the eNBs to the eNBs (block 620) and the communications system may resume normal operations.

Figure 6B:
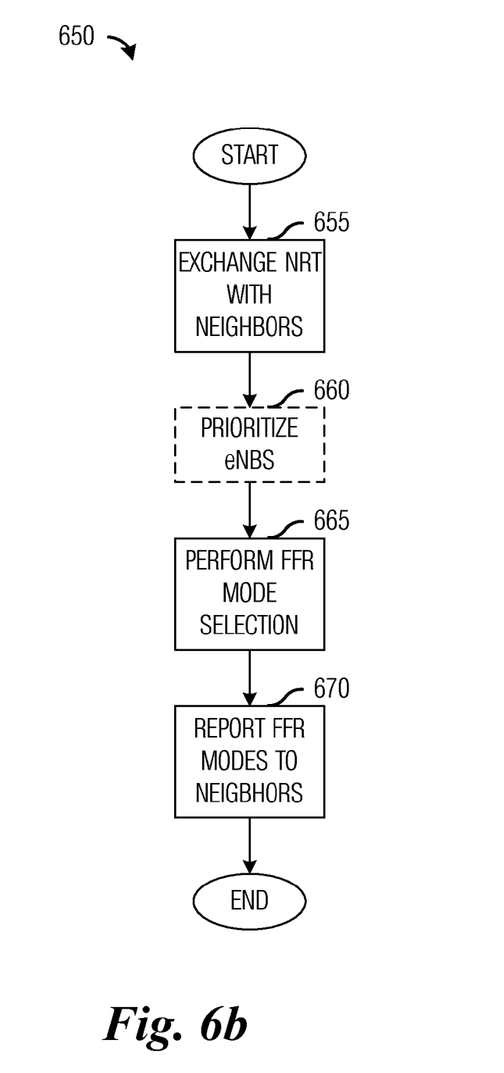
FIG. 6b illustrates an example flow diagram of operations in ICIC frequency reuse mode optimization in a distributed manner according to example embodiments described herein.

FIG. 6b illustrates a flow diagram of operations 650 in ICIC frequency reuse mode optimization in a distributed manner. Operations 650 may be indicative of operations occurring in an ICIC controller, such as an eNB, a cluster controller, or a higher cluster controller, as the ICIC controller performs ICIC frequency reuse mode optimization to meet changing operating conditions. Operations 650 may occur while the ICIC controller is in a normal operating mode.

Operations 650 may begin with the ICIC controller exchanging mutual relationship information with other ICIC controllers (block 655). If the ICIC controller is an eNB, then the eNB may exchange mutual relationship information with other eNBs when their X2 interfaces are provided, if the ICIC controller is a cluster ICIC controller or a higher cluster ICIC controller, the cluster ICIC controller or the higher ICIC controller may receive mutual relationship information from the eNBs and exchange NRTs with other cluster ICIC controllers or higher ICIC controllers. If the ICIC controller is a global ICIC controller, then the global ICIC controller may receive NRTs from the eNBs or lower-level cluster ICIC controller, such as a cluster ICIC controller or a higher cluster ICIC controller.

The ICIC controller may optionally prioritize the eNBs (block 660). According to an example embodiment, the ICIC controller may prioritize the eNBs based on the amount of interference that the eNBs receive, and select ICIC frequency reuse modes for the eNBs with the most interference, for example. Furthermore, the eNBs with the most interference may also be given priority when there are conflicts in selected ICIC frequency reuse modes. Other factors that may be used in conflict resolution include UE priority, UE distribution, geographical information, eNB priority, and so on.

The ICIC controller may perform frequency reuse mode selection for itself based on a predefined timing that may specify which ICIC controller may go first, second, etc. (block 665). The predefined timing may be based on the prioritized list of eNBs. According to an example embodiment, the ICIC controller may perform the frequency reuse mode selection for its own sectors, with an individual sector ordering that may be based on interference level of the sectors.

The ICIC controller may report the ICIC frequency reuse modes selected for the sectors to the neighbor eNBs (block 670) and the communications system may resume normal operations.

The ICIC frequency reuse modes for a cell may help improve overall communications system performance. For example, handovers may occur with less latency and with fewer failed attempts due to the reduced interference at the eNBs involved in the handover.

Figure 7:
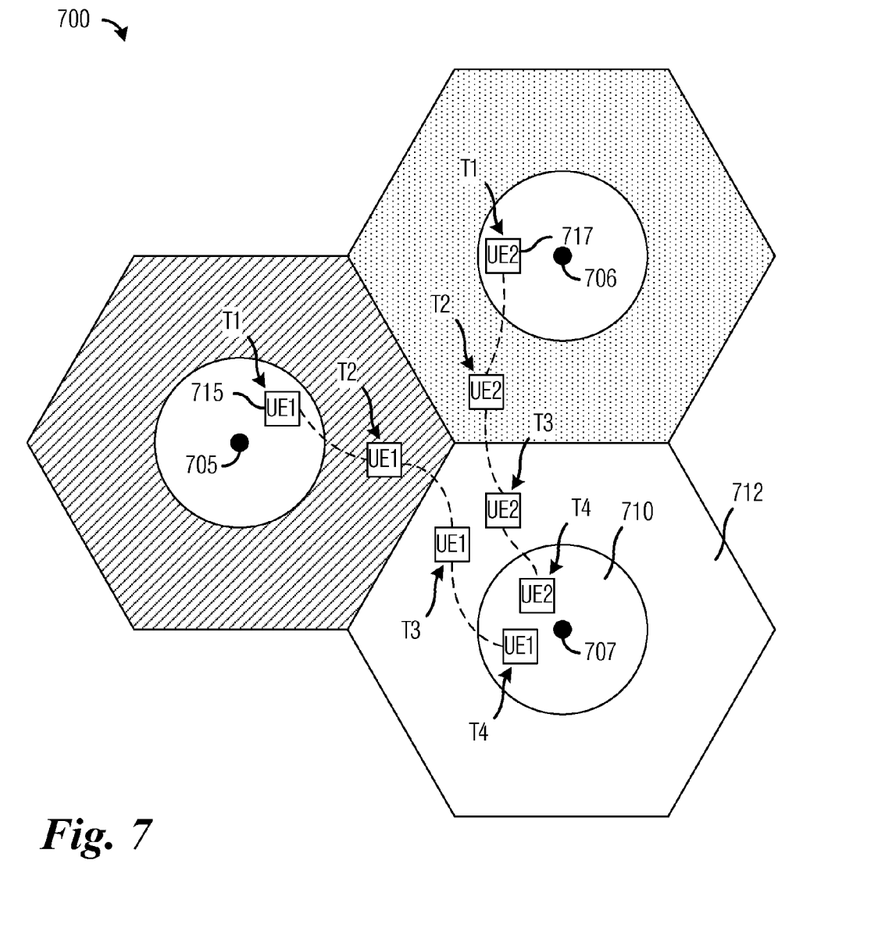
FIG. 7 illustrates an example communications system highlighting a handover operation according to example embodiments described herein.

FIG. 7 illustrates a communications system 700 highlighting a handover operation. Communications system 700 includes three eNBs, eNBs 705 through 707. Each eNB has a coverage area that is partitioned into two parts, a cell center part and a cell edge part. For example, consider eNB 707 with a coverage area partitioned into a cell center part 710 and a cell edge part 712. Other eNBs are similarly partitioned but not highlighted to maintain clarity of FIG. 7.

As shown in FIG. 7, two UEs (UE 715 and UE 717) move from a coverage area of eNB 705 (for UE 715) and eNB 706 (for UE 717) into the coverage area of eNB 707 over time. In a situation as shown in FIG. 7, it is assumed that six frequency reuse modes are employed for downlink transmissions, and each eNB is assigned a first mode (with high power) for its cell edge users with a second mode with which the eNB can use for cell center users at low power: eNB 705 uses a third frequency reuse mode (Mode 3), eNB 706 uses a fourth frequency reuse mode (Mode 4), and eNB 707 uses a fifth frequency reuse mode (Mode 5).

At a first time (T1), UE 715 is in a cell center part of the coverage area of eNB 705 and may receive service in a first frequency reuse mode and UE 717 is in a cell center part of the coverage area of eNB 706 and may receive service in a second frequency reuse mode.

As the UEs move, at second time (T2), UE 715 is in a cell edge part of the coverage area of eNB 705 and may receive service in a third frequency reuse mode and UE 717 is in a cell edge part of the coverage area of eNB 706 and may receive service in a fourth frequency reuse mode. At second time T2, the UEs still experience less interference due to usage of the third frequency reuse mode and fourth frequency reuse mode, which have been selected to reduce ICI.

As the UEs continue to move, they begin to move out of the coverage areas of eNB 705 and eNB 706 and into the coverage area of eNB 707. The UEs participate in a handover to eNB 707. When the UEs move into a cell edge part of the coverage area of eNB 705 at third time (T3), they are served by a fifth frequency reuse mode, which may have been selected to minimally interfere with the third frequency reuse mode and the fourth frequency reuse mode of eNB 705 and eNB 706 respectively. As the UEs move, at fourth time (T4), UE 715 and UE 717 are in a cell center part of the coverage area of eNB 707 and may receive service in a sixth frequency reuse mode.

As the UEs move and handover to another eNB, they are always being served by frequency reuse modes selected to minimally interfere with one another as well as high power support along the handover paths in the cell edges. Therefore, the interference received by the UEs may be small and their handovers have higher probability of success.

Figure 8:
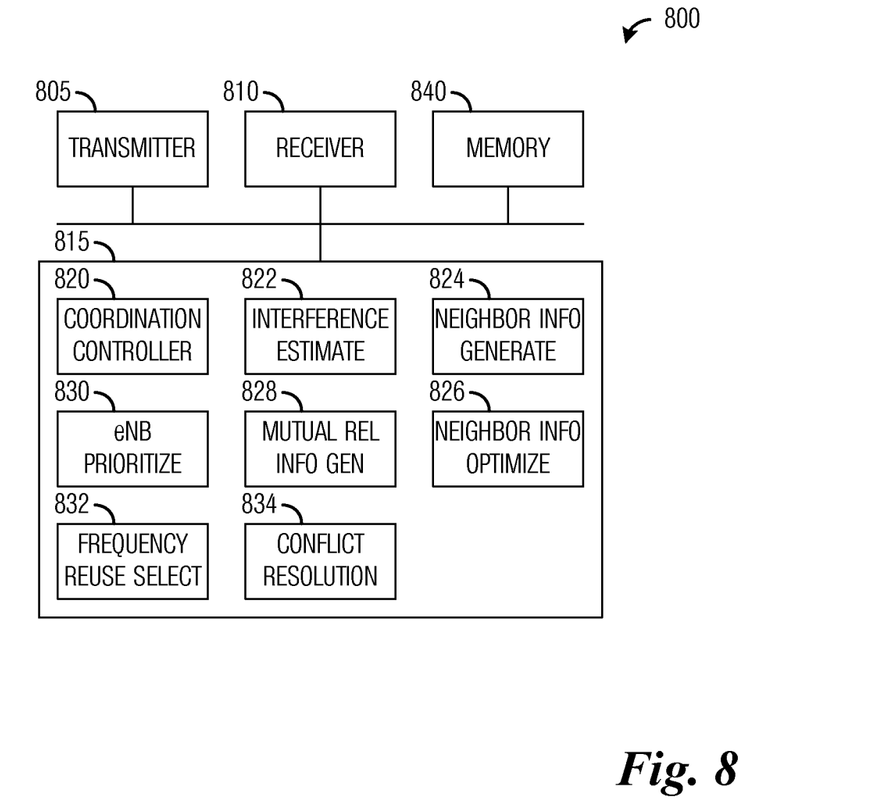
FIG. 8 provides an example communications device according to example embodiments described herein.

FIG. 8 provides an alternate illustration of a communications device 800. Communications device 800 may be an implementation of an ICIC controller, such as an eNB, a cluster ICIC controller, a higher cluster ICIC controller, or a global ICIC controller. Communications device 800 may be used to implement various ones of the embodiments discussed herein. As shown in FIG. 8, a transmitter 805 is configured to transmit information and a receiver 810 is configured to receive information.

A coordination controller 820 is configured to control coordination between ICIC controllers, such as sharing frequency reuse information, mutual relationship information, neighbor information, priority information, and so forth. An interference estimate unit 822 is configured to estimate interference at UEs based on signal power measurement reports, e.g., RSRP reports, from the UEs. Interference estimate unit 822 is further configured to make use of other information, such as channel quality information, UE categorization, and so forth, in estimating interference.

A neighbor information generate unit 824 is configured to generate neighbor information from the estimated interference. A neighbor information optimize unit 826 is configured to optimize the neighbor information generated by neighbor information generate unit 824. Neighbor information optimize unit 826 may optimize the neighbor information by sorting the neighbor information, eliminating entries from the sorted neighbor information, and so on. A mutual relationship information generate unit 828 is configured to generate mutual relationship information from the neighbor information (possibly after optimization of the neighbor information). Mutual relationship information generate unit 828 may generate the mutual relationship information from the neighbor information using information from neighbor information from neighboring eNBs, other ICIC controllers, and so on. Collectively, neighbor information generate unit 824, neighbor information optimize unit 826, and mutual relationship information generate unit 828 form a relationship information generate unit.

An eNB prioritize unit 830 is configured to prioritize eNBs based on factors such as interference (e.g., maximum interference, averaged interference, weighted interference, and so forth), geographical information, UE distribution, etc. A frequency reuse select unit 832 is configured to select frequency reuse modes, optimize frequency reuse modes, or a combination thereof, for eNBs and/or sectors of eNBs based on the mutual relationship information, neighbor information from neighboring eNBs and ICIC controllers, and so on. Frequency reuse select unit 832 is further configured to optimize existing frequency reuse modes based on the mutual relationship information, neighbor information from neighboring eNBs and ICIC controllers, and so on. Conflict resolution unit 834 is configured to resolve conflicts in selected frequency reuse modes by considering factors such as UE priority, UE distribution, geographical information, eNB priority, eNB interference, and so forth. A memory 840 is configured to store ICIC information, selected frequency reuse modes, signal power measurement reports, neighbor information, mutual relationship information, exchanged information, prioritized eNB lists, and so on.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, receiver 810 and transmitter 805 may be implemented as a specific hardware block, while coordination controller 820, interference estimate unit 822, neighbor information generate unit 824, neighbor information optimize unit 826, mutual relationship information generate unit 828, eNB prioritize unit 830, frequency reuse select unit 832, and conflict resolution unit 834 may be software modules executing in a microprocessor (such as processor 815) or a custom circuit or a custom compiled logic array of a field programmable logic array.

The above described embodiments of communications system 300 and communications device 800 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 5, 6*a*, and 6*b*—is used to indicate the desired specific use (or non-use) of such terms.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating a coordinating controller, the method comprising:
    receiving, by the coordinating controller, signal power measurements of communications devices served by communications controllers controlled by the coordinating controller;
    determining, by the coordinating controller, an interference level at one or more of the communication controllers in accordance with the signal power measurements;
    generating, by the coordinating controller, relationship information for the communications controllers in accordance with the interference level at the one or more of the communication controllers; and
    determining, by the coordinating controller, frequency reuse modes for the communications controllers controlled by the coordinating controller in accordance with the relationship information for the communications controllers.

2. The method of claim 1, wherein the receiving, the determining, the generating, and the determining are repeated upon an occurrence of a time event or a trigger event.

3. The method of claim 1, wherein the receiving, the determining, the generating, and the determining are repeated upon an occurrence of a trigger event, wherein the trigger event comprises the interference level at one or more communications controllers exceeding an interference threshold, an error rate of transmissions at one or more communications controllers exceeding an error threshold, handovers failure rates at one or more communications controllers exceeding an handover threshold, receipt of an instruction to perform frequency reuse mode optimization, or combinations thereof.

4. The method of claim 1, wherein the signal power measurements are signal power measurements made over an extended period of time.

5. The method of claim 4, wherein the signal power measurements are made by the communications devices served by the communications controllers controlled by the coordinating controller.

6. The method of claim 4, wherein the signal power measurements are in response to a Reference Signal Received Power instruction from the communications controllers.

7. The method of claim 1, wherein generating relationship information comprises:
    generating neighbor information in accordance with the interference level; and
    generating the relationship information in accordance with the neighbor information.

8. The method of claim 1, wherein selecting frequency reuse modes comprises using a centralized selection algorithm, a distributed selection algorithm, or a combination thereof.

9. The method of claim 1, wherein determining frequency reuse modes comprises selecting frequency reuse modes for a first communications controller to minimize interference with neighboring communications controllers of the first communications controller, wherein the coordinating controller controls the first communications controller and the neighboring communications controllers.

10. The method of claim 1, wherein determining frequency reuse modes comprises sending the relationship information to a higher level coordinating controller.

11. The method of claim 10, wherein determining frequency reuse modes further comprises receiving frequency reuse modes from the higher level coordinating controller.

12. A coordinating controller comprising:
    a receiver configured to receive signal power measurements of communications devices served by a plurality of communications controllers controlled by the coordinating controller;
    an interference estimate unit coupled to the receiver, the interference estimate unit configured to determine an interference level at one or more of the plurality of communication controllers in accordance with the signal power measurements;

a relationship information generate unit coupled to the interference estimate unit, the relationship information generate unit configured to generate relationship information for the plurality of communications controllers in accordance with the interference level at the one or more of the plurality of communication controllers; and a frequency reuse select unit coupled to the relationship information generate unit, the frequency reuse select unit configured to select frequency reuse modes for the plurality of communications controllers controlled by the coordinating controller in accordance with the relationship information for the plurality of communications controllers.

13. The coordinating controller of claim 12, wherein the relationship information generate unit comprises:

a neighbor information generate unit configured to generate neighbor information in accordance with the interference level; and a mutual relationship information generate unit coupled to the neighbor information generate unit, the mutual relationship information generate unit configured to generate the relationship information in accordance with the neighbor information.

14. The coordinating controller of claim 12, wherein the frequency reuse select unit selects the frequency reuse modes to minimize interference with neighboring communications controllers of a first communications controller, wherein the first communications controller is one of the plurality of communications controllers.

15. A communications system comprising:

a plurality of communications controllers with each communications controller configured to:

control communications of one or more communications devices coupled to the communications controller; and perform interference self-coordination for the one or more communications devices coupled to the communications controller using frequency reuse modes determined in accordance with signal power measurements of the one or more communications devices, an interference level at the communications controller, and relationship information for the plurality of communications controllers derived from the signal power measurements; and an intermediate coordinating controller coupled to at least a subset of communications controllers in the plurality of communications controllers, the intermediate coordinating controller configured to provide frequency reuse mode planning and optimizing for the subset of communications controllers.

16. The communications system of claim 15, wherein the plurality of communications controllers are coupled together with a communications interface for carrying interference self-coordination information.

17. The communications system of claim 15, wherein the intermediate coordinating controller is a global coordinating controller coupled to the plurality of communications controllers, the global coordinating controller configured to provide global frequency reuse mode planning and optimizing for the plurality of communications controllers.

18. The communications system of claim 17, wherein global frequency reuse mode planning and optimizing comprises selecting frequency reuse modes for each communications controller of the plurality of communications controllers, wherein the selecting is in accordance with the relationship information for the plurality of communication controllers derived from the signal power measurements, and wherein the signal power measurements are made by a subset of a plurality of communications devices in the communications system.

19. The communications system of claim 18, wherein the global frequency reuse mode planning and optimizing is in accordance with information provided by the plurality of communications controllers.

20. The communications system of claim 15, wherein the intermediate coordinating controller provides self-organized frequency reuse planning.

21. The communications system of claim 15, wherein the intermediate coordinating controller provides slow frequency reuse mode optimizing.

22. The communications system of claim 15, wherein the communications system comprises a plurality of intermediate coordinating controllers, and wherein the communications system further comprises a higher intermediate coordinating controller coupled to a subset of intermediate coordinating controllers in the plurality of intermediate coordinating controllers, the higher intermediate coordinating controller configured to provide frequency reuse mode planning and optimizing for the subset of intermediate communications controllers.

* * * * *